Nov. 9, 1948.  H. R. CONNOR  2,453,362
NONINTERLOCKING BUMPER GUARD
Filed Oct. 11, 1947  2 Sheets-Sheet 1
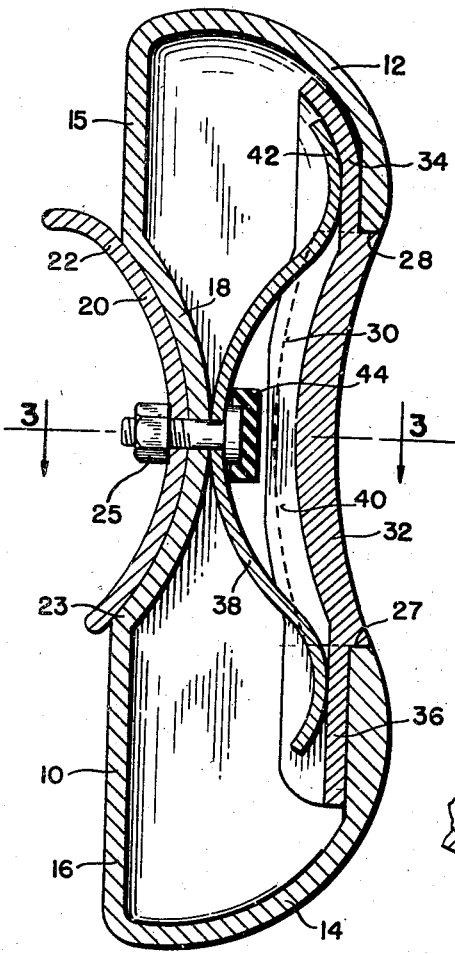
FIG_2
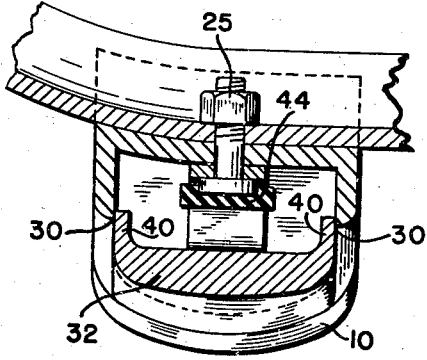
FIG_1
FIG_3
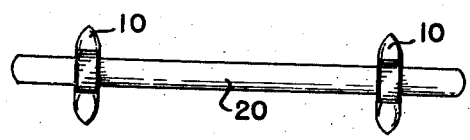
FIG_4
HARVEY R. CONNOR
Inventor
By Smith & Tuck
Attorney Nov. 9, 1948.  H. R. CONNOR  2,453,362
NONINTERLOCKING BUMPER GUARD
Filed Oct. 11, 1947  2 Sheets-Sheet 2
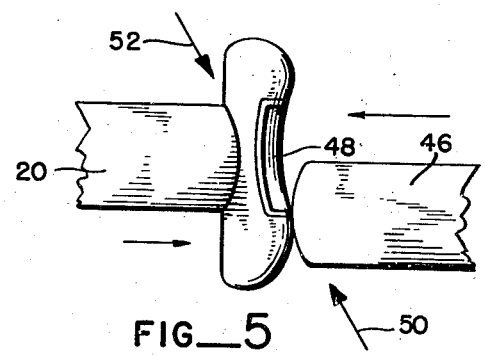
FIG._5
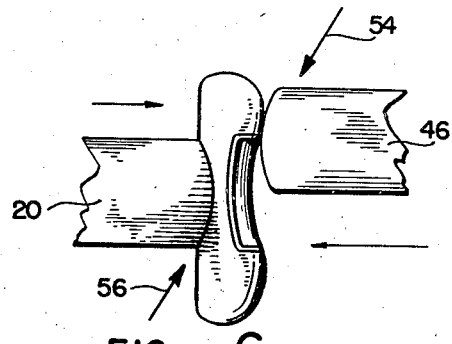
FIG._6
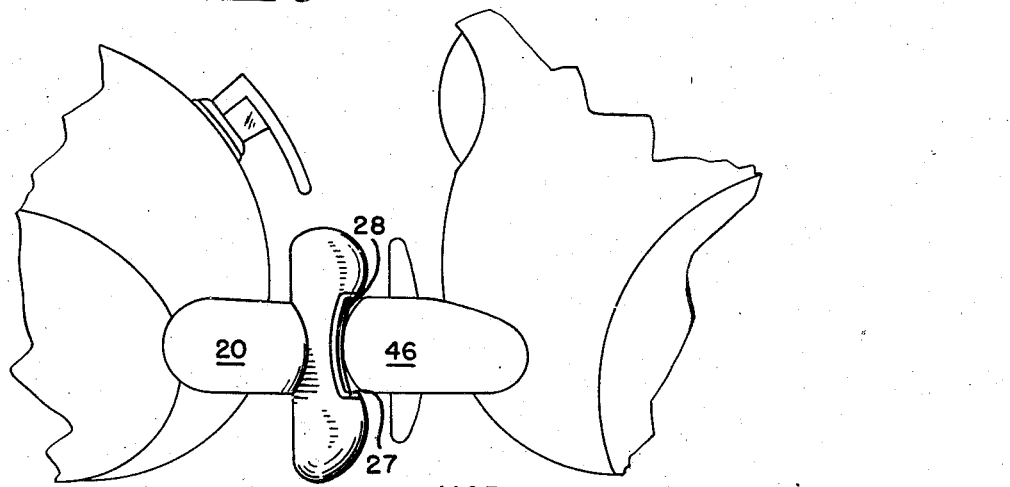
FIG._7
HARVEY R. CONNOR
Inventor
By Smith & Tuck
Attorney Patented Nov. 9, 1948

2,453,362

UNITED STATES PATENT OFFICE 2,453,362

NONINTERLOCKING BUMPER GUARD

Harvey R. Connor, Seattle, Wash.

Application October 11, 1947, Serial No. 779,389

4 Claims. (Cl. 293—67)

My present invention relates to the art of automobile accessories and, more particularly, to a non-interlocking bumper guard.

Almost every motorist has, at one time or another, experienced the unpleasant ordeal of having one or the other of his car bumpers interlock with the bumpers of another car so that disengagement is very difficult. It is to provide means that will make this interlocking very difficult, if not impossible, that I have provided my improved form of bumper guard.

When cars collide, or when one car strikes another, as in parking or the like, there is ever present the factor that promotes interlocking of the bumpers. This is usually the result of the fact that the bumpers of various cars are not positioned at the same height from the ground, or the ground itself may not be level, or have the same inclination under one car as under the other. There is, however, another reason for the interlocking of bumpers which is occasioned largely by having one car at rest, where the springs and tires are in a normal position; and another reason is where a car may be driven into another one, and the brakes applied just as the bumpers meet. Under such conditions, there is a natural tendency for the flattening of the tires, which changes the actual height of the bumper above the ground. Furthermore, in most spring suspension arrangements there is a marked tendency for a deflection of the springs either up or down, usually down, at the moment of contact, due to the winding up of the axle and the consequent distortion of the spring suspension system. All these various conditions that promote the interlocking of bumpers can, to a large degree, be overcome with my improved bumper guard arrangement.

The principal object of my present invention, therefore, is to provide means which will prevent interlocking of bumpers of engaging cars.

A further object of my invention is to provide a resilient center section of the bumper guard of my construction so that as the bumpers of two cars meet with a certain amount of applied force, this force in itself will tend to displace the central section of my bumper guard and will thus engage the car bumper meeting the guard and arrest its movement when the two bumpers are centered with respect to each other.

A further object of my invention is to so construct my bumper guards that they will assist in the centering of the bumper of the meeting car in the center of my bumper guard.

A further object of my invention is to provide resilient means which will uncover the central portion of my bumper guard and permit it to function as engaging means but which, when not in use, will have the outward appearance of a solid bumper guard.

Further objects, advantages and capabilities will be apparent from the description and disclosure in the drawings, or may be comprehended or are inherent in the device.

In the drawings:

Fig. 1 is a perspective view showing my bumper guard as applied to a section of a car bumper.

Fig. 2 is a vertical longitudinal section through a bumper guard made after the teachings of my present invention.

Fig. 3 is a cross-sectional view taken along the plane of line 3—3 of Fig. 2.

Fig. 4 is a front view of a car bumper showing two of my bumper guards in place thereon.

Figs. 5, 6 and 7 are fragmentary views showing the various meeting conditions of car bumpers and how my bumper guard tends to engage and center the bumper of the meeting car.

Referring more particularly to the disclosure in the drawings, the numeral 10 designates generally the main housing portion of my bumper guard. This may be constructed by any of the various means of manufacture now employed, such as pressing the same out of sheet stock or by casting, or by fabricating the same by welding or otherwise. In outward appearance, I prefer that my bumper will follow the changing modes for car bumpers, so that to the uninitiated the guard appears like a standard bumper guard.

Most bumper guards as currently used have considerable fore and aft depth and this fits very nicely into my present design, from the standpoint of appearance. I therefore provide the upper portion 12 and the lower portion 14, both of free-flowing curved sections, longitudinally and transversely, excepting for the side nearest the car, which I prefer to show as straight, as indicated at 15 and 16.

The car-facing wall of the bumper guard is dished in as at 18, so as to accommodate the bumpers 20, which are provided with the maximum curvature. Then it is believed it will be apparent that the curve of 18 will bear at points 22 and 23 on bumpers which may not be so sharply curved.

Following the common practice in attachment of bumper guards, I provide a central bolt, or bolts, 25, which pass through bumper 20, and provide a secure attachment for my bumper guards and prevent their displacement either in the vertical or horizontal plane.

On the outward side of my bumper guards, I provide a cut-away portion of the housing, as 27 and 28, with connecting lines of cut-out at 30. These lines must be so cut that a filler or insert member 32 can complete the contour when the guard is not in actual use, and still fulfil the requirement of permitting the insert to move toward the car when pressure is applied to it.

In the present showing it will be noted that I have provided overlapping portions at the top and bottom of insert 32, as 34 and 36. These members provide a definite stop to limit the outward movement of insert 32, even though it is made to bear outwardly by suitable resilient means, as for instance the spring 38, and to thus definitely arrest the outward effort of that resilient means.

On the sides of insert 32 I provide a skirt, as 40, which serves to guide the insert 32 on its rearward or inward movement and at the same time to seal the opening in the guard housing so as to prevent the entrance of foreign materials and further to prevent any canting of the insert as it is driven inwardly, which might tend to cause it to drop in its innermost position.

Throughout my drawings I have indicated the restoring means for insert 32, as leaf spring 38, which is secured in place by bolt, or bolts, 25. This appears to be a very convenient means, although other means to achieve the same end would no doubt occur to persons skilled in this work. In the form shown, it is to be noted that the upper end of spring 38, as 42, conforms closely to the inner curve of rest portion 34. This has a desirable function in that it prevents the insert 32 from being displaced downwardly by gravity in case the surface 27 should for any reason prove inadequate to maintain the position of the insert.

In order to prevent a metal-to-metal impact in case insert 32 is struck with considerable force, I have provided a resilient bumper as 44, which may be made of any suitable material and of sufficient amount to form a final stop or bumper.

Method of operation

In use, it has been found that a bumper guard constructed after the teachings of my present invention will tend to center the car bumper on which it is secured with the bumper of a car which engages it. This function is probably best illustrated in the fragmentary views of Figures 5, 6 and 7.

Referring to Fig. 5, let it be assumed that the bumpers of two cars meet, bumper 20 carrying my bumper guard, and the bumper 46 of another car. Due to the concave contour of my bumper as shown and particularly the concavity at 48 of the insert 32 and the free-flowing curves that go up to meet the curves of the upper portion 12 and down to meet the curves of the lower portion 14, bumper 46 will tend to rise as force is applied, following the direction of arrow 50. On the other hand, due to the same applied force, bumper 20 will tend to be forced downwardly as though a force were applied at 52. It must be remembered in these considerations that the bumpers, while they are more or less fixedly secured to the cars, tend to move as the cars themselves are capable of being raised or lowered due to the action of the distortion of the tires or the working of the spring suspension system of one or both of the cars.

In Fig. 6 I have shown the other alternate meeting of two bumpers. In this case, due to the curve of my bumper tip, bumper 46 tends to be driven downwardly in the direction of arrow 54, whereas bumper 20 tends to be driven upwardly after the showing of the arrow at 56.

Experience has proved that when either of the two conditions enumerated above occur, the application of force and the resilience of the tires and bumpers and spring suspension of the cars will center the bumpers so that the end result of this action will be as shown in Fig. 7, just as though two car bumpers met and were of exactly the same height above the ground at the point of meeting. It is believed that it will be understood that as soon as bumper 46 engages in the cut-out portion of my bumper guard, there will be a physical arresting of any upward or downward movement by surfaces 27 and 28 and thus the real purpose of my invention is achieved.

It is believed that it will be clearly apparent from the above description and the disclosure in the drawings that the invention comprehends a novel construction of a non-interlocking bumper guard.

Having thus described my invention, I claim:

1. A non-interlocking bumper guard designed for attachment to the front or rear bumper of an automobile, consisting of: a housing member having an interior cavity and an outer shell, said outer shell being deformed to engage the surface of a meeting car bumper; means for securing said housing to the car bumper; a curved upper housing portion; a curved lower housing portion; each of said upper and lower housing portions having a horizontal bearing surface on their inwardly directed ends; vertically disposed cuts in said housing adapted to provide bearing surfaces and to form with the surfaces of the upper and lower housing members an opening into the interior of said hollow bumper guard; an insert member adapted for movement within said opening; upper and lower stop portions formed as continuations of said insert; resilient means disposed to urge said insert outwardly of said housing member; and cushioning means disposed to limit the inward displacement of said insert.

2. A non-interlocking bumper guard designed for attachment to the front or rear bumper of an automobile, consisting of: a housing member having an interior cavity and an outer shell, said outer shell being deformed with a concave face adapted to engage the surface of a meeting car bumper; means for securing said housing to the car bumper; a curved upper housing portion; a curved lower housing portion; each of said curved portions flowing into said concave face; each of said upper and lower housing portions having a bearing surface on their inwardly directed ends; vertically disposed cuts in said housing adapted to provide bearing surfaces and to form with the surfaces of the upper and lower housing members an opening into the interior of said hollow bumper guard; an insert member adapted for movement within said opening; upper and lower stop portions formed as continuations of said insert; and means for limiting the inward movement of said insert and for restoring it to its normal position after deflection.

3. A non-interlocking bumper guard designed for attachment to the front or rear bumper of an automobile, consisting of: a housing member having an interior cavity and an outer shell, said outer shell being deformed to engage the surface of a meeting car bumper; means for securing said housing to the car bumper; a curved upper housing portion; a curved lower housing portion; each of said upper and lower housing portions having a bearing surface on their inwardly directed ends; vertically disposed cuts in said housing adapted to provide bearing surfaces and to form with the surfaces of the upper and lower housing members an opening into the interior of said hollow bumper guard; an insert member adapted for movement within said opening; said insert member being proportioned to fill said opening and give the appearance of a normal bumper guard; and upper and lower stop portions formed as continuations of said insert.

4. A non-interlocking bumper guard designed for attachment to the front or rear bumper of an automobile, consisting of: a housing member having an interior cavity and an outer shell, said outer shell being deformed to engage the surface of a meeting car bumper; means for securing said housing to the car bumper; a curved upper housing portion; a curved lower housing portion; a substantially rectangular opening in the outer face of said housing; each of said upper and lower housing portions having a horizontal bearing surface where their curves meet said opening; vertically disposed bearing and guiding surfaces in said housing formed as the sides of said opening; an insert member forming a sealing member for and adapted for movement within said opening; upper and lower stop portions formed as continuations of said insert; and resilient restoring means for said insert.

HARVEY R. CONNOR.

REFERENCES CITED

The following references are of record in the file of this patent:

UNITED STATES PATENTS

| Number | Name | Date |
|---|---|---|
| 2,291,370 | Brunner | July 28, 1942 |
| 2,293,689 | De Pace | Aug. 18, 1942 |